Nov. 20, 1934.   F. W. COTTERMAN   1,981,823
MOTOR VEHICLE TRANSMISSION GEARING
Filed Oct. 21, 1933    2 Sheets-Sheet 1

INVENTOR
Frederick W. Cotterman

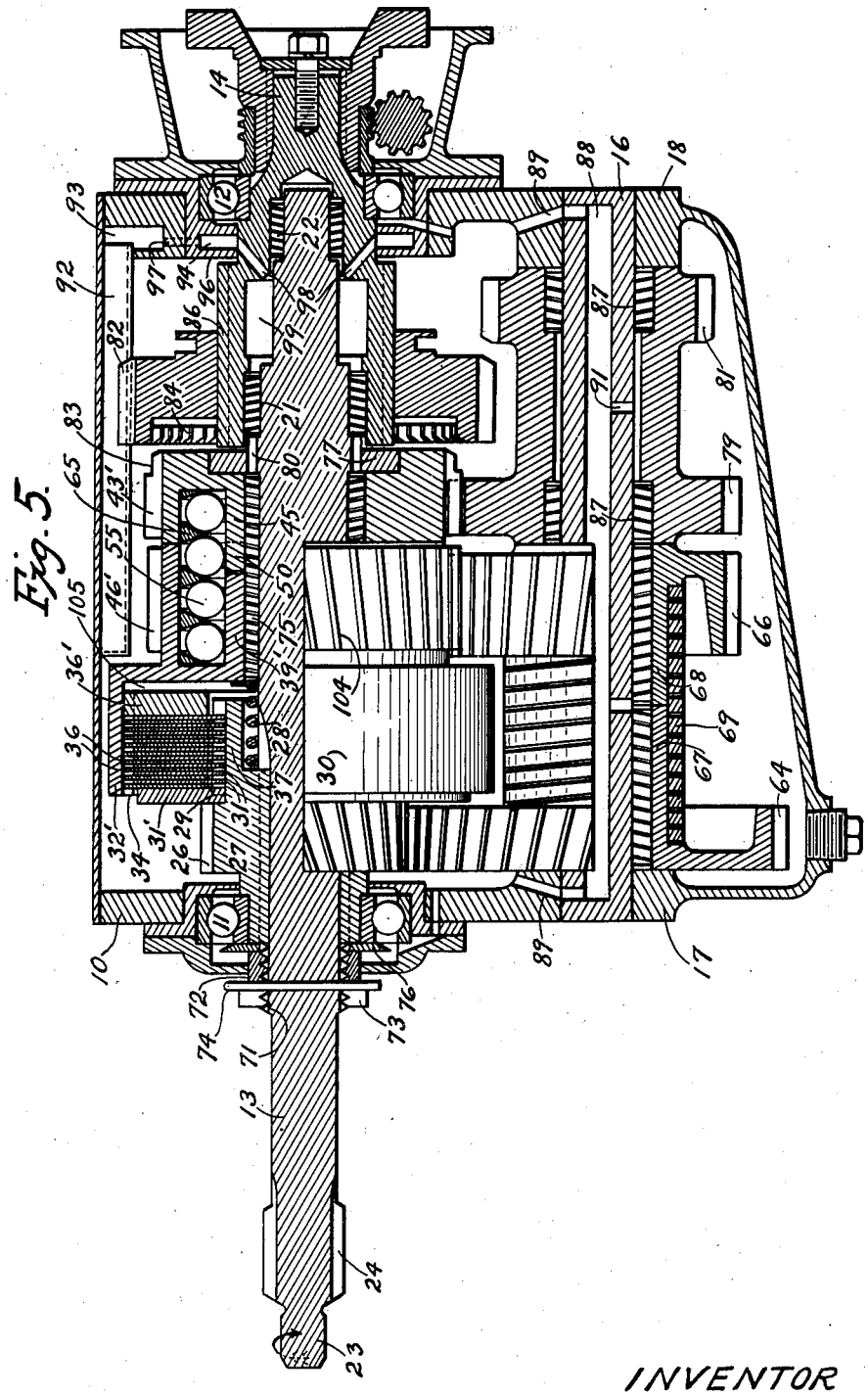

Patented Nov. 20, 1934

1,981,823

UNITED STATES PATENT OFFICE 1,981,823

MOTOR VEHICLE TRANSMISSION GEARING

Frederick W. Cotterman, Dayton, Ohio, assignor of one-half to Bessie D. Apple, Dayton, Ohio Application October 21, 1933, Serial No. 694,627

20 Claims. (Cl. 74—336)

This invention relates to transmission gearing, and is particularly applicable to automotive vehicles.

An object of the invention is to provide a mechanism which functions automatically to change the ratio of revolutions between the engine and vehicle wheels during all ordinary driving conditions, but which comprises also a manually shiftable mechanism which may be employed in overcoming unusually heavy load conditions, and for driving down unusually steep grades "in gear" as well as for reversing the vehicle movement.

Another object is to provide, in the automatic ratio changing mechanism, a direct drive and a gear drive together with a means which will at all times strike a balance between the load which movement of the vehicle is presenting and the power which the manually controlled automotive engine is being caused to develop, and which will then set the gear ratio accordingly, to the end that at any time that the load, as balanced against the power, is such as to make the gear drive undesirable, a shift to direct drive will automatically take place. Also, at any time that the power, as balanced against the load, is so small as to make it inadvisable to continue in direct drive, a shift back to gear drive will automatically take place.

Another object is to provide an automatic unit comprising a clutch for direct drive, and reduction gearing for gear drive, together with mechanism which balances the load against the power in such a way that an increase in power tends always to increase the tendency of the clutch to engage for direct drive while the then existing load of vehicle movement tends always to oppose the means which is trying to effect clutch engagement.

Another object is to provide an automatic unit comprising a clutch for direct drive which is engageable by axial pressure supplied by centrifugal weights, and gears for gear drive which have helical teeth such that the tangential load on the helical gear teeth has an axial component opposite in direction to the clutch engaging pressure of the weights, together with means to balance said axial component against said weight force to pull them toward or allow them to move away from the axis of rotation as said axial component exceeds or is less than said weight force.

Another object is to so balance the load of vehicle movement, which tends always to disengage the clutch and cause gear drive, against the power, which tends always to engage the clutch for direct drive, that when the one force overbalances the other, considerable overbalancing force is automatically added to the one force which has overbalanced the other, to the end that the clutch will not, over extended periods of time, be partially but insufficiently engaged and subject to consequent wear.

Another object is to so construct the ratio changing mechanism that it will normally function automatically, but will nevertheless be subject to the will of the operator to the extent that he may, by governing the amount of power generated, and the rapidity with which it is increased or decreased, control the change in ratio of the drive to meet his particular desire.

Another object is to employ, in the mechanism which automatically changes from gear to direct drive and vice versa a disc clutch of such general type as is known to be highly successful when operating in an oil bath within the transmission housing, and which has a large contact area operating at low contact pressure, to the end that all of the oil will never be entirely pressed from between the clutch discs, whereby little or no wear results, and adjustment is seldom if ever required, but which nevertheless may, if it should become necessary, be adjusted by a single nut, placed outside of the housing whereby adjustment may be accomplished with minimum effort.

Another object is to provide, in a transmission unit which automatically changes from gear drive to direct drive and vice versa, mechanism which will make the change from one drive to the other without a time interval between them, the one drive always becoming effective before the other lets go, to the end that there will be no time between direct drive and gear drive in which there is no drive, as there is in present transmission mechanisms.

Another object is to provide unique lubricating means for the bearings of the automatic unit.

Another and more general object is to provide means to attain the foregoing objects with substantially no more mechanism, and requiring substantially no greater space, and being of no greater cost than transmission mechanism now in general use.

I attain the foregoing objects and other meritorious features in the mechanism hereinafter described, reference being had to the drawings, wherein, Fig. 1 is a longitudinal vertical axial section through the transmission mechanism.

Fig. 5 shows a modification of the invention.

Similar numerals refer to similar parts throughout the several views.

Figure 1:
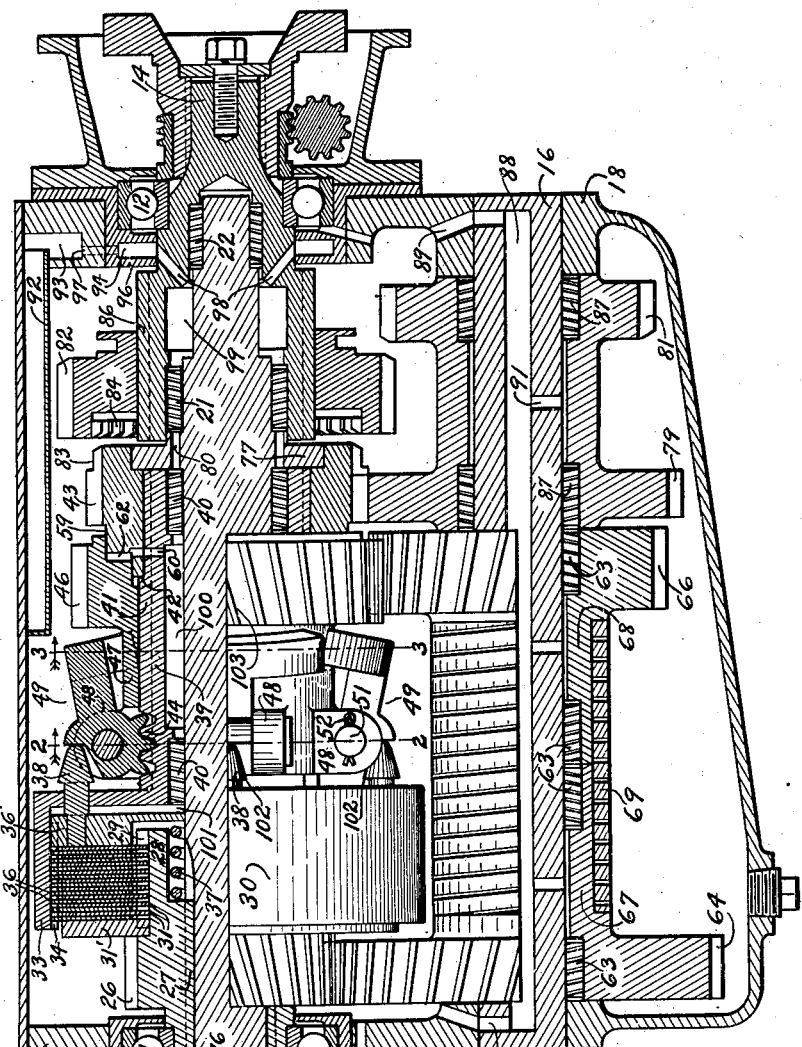

In the drawings the housing 10 carries ball bearings 11 and 12 within which the high speed drive shaft 13 and a coaxial low speed driven shaft 14 rotate. A parallel spaced apart countershaft 16 is non-rotatably fixed in the hubs 17 and 18.

The rear end of the drive shaft 13 is rotatable within the driven shaft 14 on roller bearings 21 and 22. The front end of the drive shaft 13 is reduced in diameter at 23 for a ball bearing, to provide support at this end of the shaft in the end of the engine crank shaft. The arrow 20 indicates the direction in which the shaft 13 rotates.

The drive shaft 13 is splined at 24 for the hub of a flywheel clutch plate. The flywheel clutch employed to drivably connect the shaft 13 to the engine may be the conventional foot operated type, but is preferably a vacuum operated type such as is commercially known as the "Bendix vacuum", or the improvement thereon shown in my co-pending application Serial Number 661,325, filed March 17, 1933.

Rotatable within the housing 10 about the axes of the shafts 13, 14 and 16 are the transmission gears, the front half of the housing containing the automatic gear set and the rear half the manual gear set. Each set comprises a drive gear, a driven gear and two countershaft gears. For clearness of description the sets of gears will be referred to as the automatic gears and the manual gears.

It will be observed that the last driven gear of the automatic set is the element from which power is taken to drive the manual set. This gear then becomes the driving gear of the manual set. For clearness, therefore, the driving gear of the manual set will, when used in a combination of elements defining the automatic mechanism, be referred to as the power take-off element.

In the automatic gear set is the automatic drive gear 26 which has internal splines fitted snugly to the external splines 27 of the drive shaft 13. The gear 26 is the only gear of the entire mechanism which at all times rotates in unison with the drive shaft 13.

The automatic drive gear 26 has a rearwardly extending hub 28 with teeth 29 around its periphery. A series of driving clutch plates 31 are internally toothed to fit over the teeth 29 and consequently rotate in unison with the gear 26. One driving clutch plate 31' is thicker than the remaining plates 31 and is preferably press fitted to the teeth 29 while the plates 31 are slidably fitted thereon.

A clutch drum 33 has internal teeth 34 around its periphery. A series of driven clutch plates 36 are externally toothed to fit slidably in the teeth 34 and consequently rotate in unison with the drum 33.

A pressure plate 36' is thicker than the remaining plates 36. A coil spring 37 urges the pressure plate 36' rearwardly. Pressure pins 38 extend through the rear wall of the drum. Driving plates 31 and driven plates 36 alternate in position in the assembled structure. It will be apparent that pressure applied to the rear ends of the pins 38 will compact the plates and engage the clutch. This clutch may be broadly designated by the numeral 30.

The clutch drum 33 has a long hub 39 extending rearwardly. The hub is freely rotatable about the drive shaft 13 on roller bearings 40. Hub 39 has four splines 41 preferably extending the full length. At the rear end of the hub the splines 41 are reduced in height to provide the shoulder 42. A gear 43 is press fitted over the splines and against the shoulder 42 which prevents axial movement of the gear on the splines. From the gear 43 power is taken off of the automatic unit. It may therefore be referred to as the power take-off element.

At the forward end of the hub 39 adjacent the drum 33 each of the four splines 41 is grooved transversely to form the rack teeth 44. Intermediate the gear 43 and the rack teeth 44, and axially slidable on the splines 41 is the internally splined gear 46. This gear receives the power for the driven mechanism of the automatic unit from the driving member and may therefore be referred to as the power receiving gear of the driven mechanism.

Figure 2:
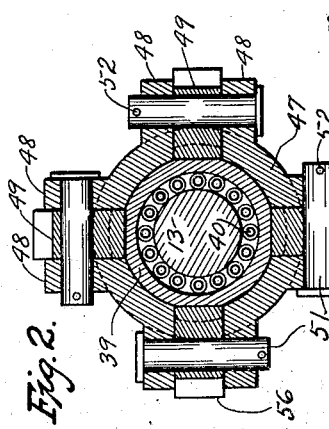
Figs. 2 and 3 are transverse sections taken through Fig. 1 at 2—2 and 3—3 respectively.
Figure 4:
Fig. 4 is a perspective view of one of the centrifugal members employed to provide axial pressure to engage the clutch.

The gear 46 has a forwardly extending hub 47 which, at its extreme forward end, has four pairs of ears 48 (see Figs. 1 and 2). Four centrifugal members 49 (see Fig. 4) are hingedly supported between pairs of ears 48. Hinge pins 51 extend through each pair of ears and member 49. The hinge pins are held in place by the small cotter pins 52.

Each centrifugal member 49 comprises a hub portion 53 carrying downwardly extending pinion teeth 54, an upwardly extending pressure finger 56, a rearwardly extending weight arm 57 and a segmental weight 58. When the members 49 are in place the pinion teeth 54 extend into the spaces between the rack teeth 44.

The internal splines which extend through the gear 46 and its hub 47 fit freely on the external splines 41. This construction permits axial movement of the gear 46 and its hub 47 over the clutch drum hub 39 but at all times compels rotation in unison of the entire driven mechanism comprising the driven clutch plates 36, drum 33, hub 39, centrifugal members 49, power receiving gear 46, and power take-off gear 43.

A ground piston like hub 59 of the gear 43 fits snugly but slidably in a ground cylinder like hole in the gear 46. This provides a pocket 62 into which oil will be drawn whenever the gear 46 moves axially away from the gear 43 and from which oil must be expelled whenever the gear 46 moves axially toward the gear 43. A small hole 60 connects the pocket 62 with the oil containing space 65. The size of the hole 60 determines the rapidity with which oil may be transferred between the pocket 62 and the space 65, which limits the time within which the gear 46 may be moved axially, and within which the centrifugal members 49 may operate. This dash pot structure will of course prevent a too rapid engagement or disengagement of the clutch 30.

Rotatable on the roller bearings 63 about the countershaft 16 and in mesh with the gears 26 and 46 are the countershaft gears 64 and 66.

Gears 64 and 66 have long hubs 67 and 68 extending toward each other. An external wrap spring ratchet 69 surrounds these hubs. This ratchet spring 69 is right hand coiled which permits the gear 66 to revolve faster but not slower than the gear 64.

Gears 26, 64, 66 and 46 all have helical teeth. A portion of the axial section Fig. 1 is shown in elevation to indicate the helical angles which are preferably employed. It will be noted that the tooth angles are such that they force the gears 64 and 66 toward each other thus neutralizing all thrust on the hub 17 against the gear 79. This insures that the ends of the hubs 67 and 68 will always be pressed together tightly so there will be no gap for the spring 69 to bridge.

At the forward end of the housing 10 the shaft 13 has the threads 71 to which the nut 72 is fitted. The nut 72 is slotted at 73, and a pin 74 extends through this slot and through the shaft. An oil throw washer 76 is clamped between the nut 72 and the ball bearing 11. A collar 77 is an integral part of the shaft 13. The parts of the automatic unit except those which are on the countershaft are held between the nut 72 and the collar 77. A series of small holes 80 extend through the collar 77 to permit the passage of lubricating oil.

The manual gear set comprises the manual driving gear 43, the first and second manual countershaft gears 79 and 81, and the sliding high and low gear 82. A reverse idler is required so that the vehicle may be moved backward but inasmuch as it forms no part of this invention it is not herein shown.

Gear 82 is shown in the neutral position. Gear 43 has part of its tooth face at 83 reduced in diameter to provide clutch teeth. The sliding high and low gear 82 has internal clutch teeth 84 corresponding to the clutch teeth 83. The gear 82 has internal splines which fit slidably over the external splines 86 of the shaft 14. The gears 79 and 81 are integral and revolve on roller bearings 87. Conventional means may be employed for shifting the sliding gear 82 and for effecting a reverse, or the means shown in my co-pending application Serial Number 687,758 may be used.

When the gear 82 is shifted forwardly until the clutch teeth 83 enter the teeth 84 the connection which may be called manual high gear is made.

When gear 82 is shifted rearwardly until it meshes with the gear 81, manual low gear is established. Reverse connection may be made by providing a wide gear which will mesh with both gears 82 and 81 while they remain in the position shown.

The lubricating means for the countershaft gearing comprises the central hole 88 extending the length of the countershaft, the holes 89 for entry of the oil, and feeder holes 91 extending from the central hole to the spaces between the roller bearings.

The lubricating means for the drive shaft bearings comprises a trough 92 into which oil is splashed by the gears 46, 43 and 82, the reservoir 93, cast in the housing 10, which receives the oil from the trough 92, the groove 94, in the bearing cup 96, which is connected to the reservoir by a hole 97, the small holes 98 in the shaft 14, and the oil chambers 99 and 100.

The oil splashed into the trough 92 flows into the reservoir 93 then into the groove 94. Centrifugal force now prevents its passage through the holes 98. But whenever the shaft 14 ceases to rotate, the oil will flow through holes 98 into chamber 99 and thence forwardly through the roller bearings 21, holes 80, bearings 40, chamber 100 and into the space 101 within the clutch drum 33.

It will be observed that the entrances of the holes 98 into the chamber 99 are closer to the axis of rotation than the outer diameter of the chamber. This construction prevents oil which has once gotten into the chamber 99 from being thrown out again by centrifugal force. Lubricating means of the character here shown is the subject of a co-pending application Serial Number 675,238, filed June 10, 1933.

Figure 3:
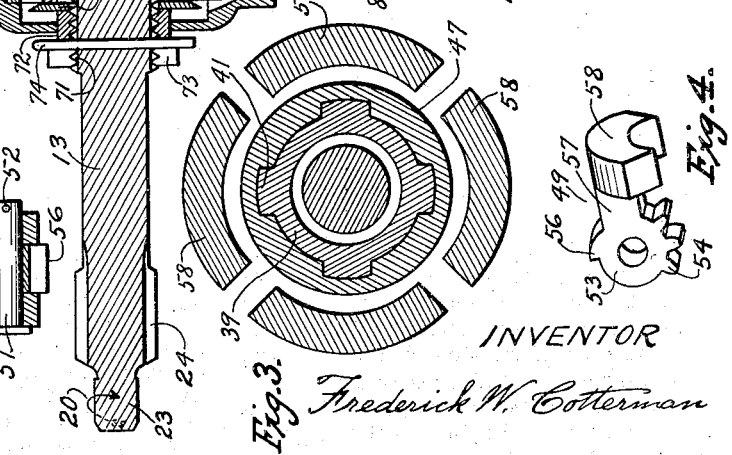

When the mechanism hereinbefore described is first put into use it is preferably adjusted by screwing up the nut 72 tightly so that the plates 31, 31', 36 and 36' are packed tightly together and the segmental weights 58 are all forced inwardly until they lie against the hub 47 (see Fig. 3). The nut 72 is then backed away one complete turn and the pin 74 inserted. This will leave .005 inch space between adjacent plates. These .005 inch spaces will be taken up by movement of the weights 58 through half of their possible travel.

When the plates become worn so that there are .006 inch spaces between adjacent plates, then the weights merely travel through six tenths of their possible travel to take up the spaces.

It is not until the plates become worn to an extent which will leave .010 inch spaces between adjacent plates that adjustment must be repeated, for, when there are .010 inch spaces between adjacent plates it will have become necessary for the weights to move outwardly far enough to press the shoulders 102 of the pins 38 against the rear wall of the drum 33 before the clutch plates become compacted. It will be noticed that the nut 72 is outside the housing 10 so that the housing need not be opened to make the adjustment.

To provide a uniform and effective graduation of ratios the manual gear set is preferably designed for one and one-half revolutions of gear 43 to one revolution of gear 82 when driving the gear 82 through the gears 79 and 81. The automatic gear set is preferably designed for two revolutions of gear 26 to one of gear 46 when driving the gear 46 through the gears 64 and 66. By adopting these gear proportions a ratio of 3 to 1 is had when the automatic and the manual gear set is operated in tandem, a ratio of 2 to 1 is had when the automatic gear set is effective and the manual unit is in direct drive, a ratio of 1½ to 1 is had when the automatic unit is in direct drive and the manual gear set is effective, and a ratio of 1 to 1 is had when both units are in direct drive.

The several parts of the mechanism shown are accurately proportioned, and, if the distance from the center of the ball bearing 11 to the center of the ball bearing 12 is taken as 13 inches and other parts taken to this scale, all parts of the transmission will be of proper size for a vehicle having an engine capable of delivering 125 foot pounds torque at 3000 R. P. M.

But in order that those skilled in the art may more readily adapt the invention to engines of other power the manner of arriving at the proportions shown may preferably be briefly described.

When 125 foot pounds is applied to shaft 13 and transmitted through the 2 to 1 gear train to the gear 46, the gear 46 must carry 250 foot pounds. The pitch radius of the gear 46 is 2.3 inches. The tangential pressure at this pitch line is then $12/2.3 \times 250 = 1300$ pounds.

The helix angle of the teeth 103 of the gear 46 is 14°—55'. The tangent of 14°—55' is .26639. Allowing a small loss for friction the axial component of the 1300 pounds tangential pressure is about 325 pounds. It follows that when the gear 46 is transmitting the full power which the engine can develop at 3000 R. P. M., there is a force of 325 pounds urging the gear 46 axially rearward toward the gear 43. This 325 pounds is one of the forces which the centrifugal weight masses must overcome before they can start to move outwardly from a position against the hub 47 to the out position shown in the drawings, when the transmission is carrying maximum load.

Another force which the centrifugal weight masses must overcome before they may move outwardly from the axis, is the force of the spring 37. The spring 37 is preferably made so that it will exert an axial force against the plate 36' of 50 pounds. This 50 pounds is transmitted by the pressure pins 38 to the pressure fingers 56. The distance from the pressure pins 38 to the pitch line of the rack teeth 44 is 1.125 inches. The distance from the center of the hinge pins to the pitch line of the rack teeth 44 is .625 inch. The 50 pound spring pressure is then exerted to move the gear 46 axially rearward through a leverage of 1.125/.625 × 50 = 90 pounds.

This 90 pounds pressure due to the spring 37 must be added to the 325 pounds pressure due to the helix angle of the teeth of the gear 46 to determine the total axial pressure which the centrifugal weight masses must overcome before they may start to move outwardly from the axis when the gearing is carrying maximum load. This added pressure will be 90 plus 325 which is 415 pounds. From this the size of the centrifugal weight masses may be determined.

The combined weight of the four arms 57 and the four segmental weights 58 is 1.9 pounds. The center of gravity of each of the four masses is 1.8 inch from the axis of the shaft 13 when the weights are in the "in" position. At 3000 R. P. M., of the shaft 13, or 1500 R. P. M., of the weights these weights exert an outward force of 217 pounds. The distance from the center of gravity to the center of the hinge pin 51 is 1.2 inches. The distance from the center of the hinge pin 51 to the pitch line of the pinion teeth 54 is .625 inch. The 217 pound centrifugal force is then applied to move the gear axially through a leverage of 1.2/.625. It therefore exerts 217 × 1.2/.625 = 415 pounds. It follows that if the centrifugal weight masses exert a force of 415 pounds to move the gear 46 axially forward, and the spring 37 and the helical teeth 103 exert a force of 415 pounds to move the gear 46 axially rearward, the forces are in equilibrium. At the slightest increase of speed above 3000 R. P. M., of the engine the centrifugal weight masses will move outwardly against maximum load and engage the clutch 30 thereby changing from automatic gear drive to automatic direct drive.

Now the distance between the clutch plates 31 and 36 is such that, in order to engage the clutch 30, the center of gravity of the weight masses must move from a position of 1.8 inches from the axis of shaft 13 to 2.06 inches from the said axis. It follows that when the weights once overbalance the load they move outwardly from 1.8 inches to 2.06 inches from the said axis and consequently the 415 pounds which they exerted before they started outward becomes 2.06/1.8 × 415 = 475 pounds after they move out. This excess, i. e., 475 − 415 is 60 pounds, which pressure is applied to compact the clutch plates.

Now 60 pounds axial pressure, compacting the clutch plates, will not carry the full load of 125 foot pounds in direct drive. But when this 60 pounds is applied to the clutch plates, the clutch 30 assumes about one-fourth of the load. This lessens the load on the gear 46 by one-fourth. Lessening the load on the gear 46 by one-fourth lessens the gear restraint on the weight masses by that amount. This results in more weight energy going to compact the plates, which in return results in more load being removed from the gear 46. This process is repeated by infinitesimal increment over a period of several seconds whereupon all of the force of the weight masses will have been removed from the gearing and the entire weight force will be effective to keep the clutch engaged.

When the clutch has thus become fully engaged it will have braked the engine down from 3000 R. P. M., which it was revolving when gear drive was effective to 1500 R. P. M., leaving the gear 46 revolving at the same speed as before, but under zero load.

The pressure which is now being applied to compact the clutch plates must be known before it may be determined how much, at maximum load, the speed must be reduced before the clutch will slip and permit the gears to again assume the load.

It has been heretofore determined that the outward force exerted by the weight masses at their centers of gravity is 217 pounds. Since this is applied to the pins 38 through a leverage of 1.825/1.125 the pressure on the pins 38 will be 350 pounds, but inasmuch as the spring 37 exerts 50 pounds oppositely there remains a clutch engaging pressure of 300 pounds.

Now the area and material and lubrication of the clutch plates is such that, under maximum load, 125 foot pounds engine torque, it will slip when the pressure on the plates has been reduced to 150 pounds. This will occur when the vehicle speed has been reduced by overload to about 75% of the speed at which the clutch engaged under maximum load, i. e., it will slip when the revolutions of the weights have been reduced from 1500 R. P. M., to about 1125 R. P. M. The 25% overlap prevents the clutch from "hunting", i. e., from frequent change from engagement and disengagement and vice versa, when the load and power are closely in balance.

Now when, from overload, the driving clutch plates 31 start to slip, the driving plates start to gain speed over the driven plates 36. But the plates are still under 150 pounds pressure and are consequently still driving. But in several seconds the speed of the engine has doubled, whereupon the overrunning ratchet in the gear train becomes effective and the gearing starts to take up the load.

As soon as the gearing takes up a slight amount of the load, axial movement of the gear 46 takes place, and effort is thereby exerted to lessen the pressure between the clutch plates. Lessening the pressure between the clutch plates throws more load on the gear. This interchange is repeated over a period of several seconds, in which both direct and gear drive act together, until the gears will be carrying all of the load and the driving gear 26 will be revolving at double the speed of the driven gear 46.

It will now be apparent that when the mechanism changes from gear drive to direct drive and vice versa there is no interval when neither drive is effective, but that both drives are in effect for an instant while the transfer is taking place. During the instant of transfer the clutch 30 of course drives somewhat but slips somewhat in doing so. This is true whether the shift is up or down. This transfer instant may be prolonged to several seconds by suitably restricting the small hole 60 through which oil is drawn into the dash pot pocket 62.

With the mechanism proportioned as hereinbefore described, and assuming that when the engine is continuously exerting its maximum of 125 foot pounds torque it will be able to bring the vehicle to a speed of about 30 M. P. H., at 3000 R. P. M., it follows that at maximum engine effort, the shift from automatic gear drive to automatic direct drive will occur, when the vehicle, against the then existing resistance can attain a speed of 30 M. P. H., but that if the same power conditions are maintained and the load increases sufficiently to reduce the vehicle speed to 22½ M. P. H., the shift back to automatic gear drive will take place.

By a similar calculation it may be found that if the operator is causing the engine to exert a constant torque of 25 foot pounds the mechanism will shift from gear drive to direct drive at about 14½ M. P. H., and, when the 25 foot pounds force becomes overloaded it will shift back to gear drive at about 10 M. P. H.

The foregoing are merely statements of what would occur if a vehicle operator set the fuel at any certain fixed value and kept it fixed, first against a load which permitted vehicle acceleration and next against a load which caused deceleration. But it must be understood that the shifting of the automatic unit from gear drive to direct drive is almost entirely within the control of the operator, and that the automatic feature does not override the will of the operator except when load conditions are encountered which make it highly desirable that a shift should take place, and the operator from inexperience or otherwise ignores this fact.

When the automatic unit is in gear drive, and under a moderate load, the operator may remain in gear drive indefinitely by so controlling his fuel that it will be inadequate to properly carry that load in direct drive. Or, he may at any time change to direct drive by regulating his fuel so as to increase his speed against the load to a point where it becomes advisable to carry the load in direct drive. Or, he may, while in gear drive, if the load is any less than that requiring maximum engine effort with gear drive, change to direct drive by suddenly decreasing his fuel, which in turn decreases the torque being transmitted faster than deceleration of the vehicle takes place, thereby releasing the centrifugal weights for effecting direct drive.

On the other hand if the unit is in direct drive and under a moderate load, the operator may keep the unit indefinitely in direct drive by so controlling his fuel that it remains adequate to carry the load in direct drive. Or, he may at any time change to gear drive, either by lowering his fuel gradually until the vehicle speed is decreased by the moderate load to a point where it is inadvisable to carry it in direct drive, or by suddenly increasing his fuel and consequently the torque load being transmitted faster than the inertia of the vehicle permits the torque to be translated into speed.

The M. P. H., a which these changes may be made will of course depend on the load which is being encountered. The operator cannot change from gear drive to direct drive against load conditions which would stall the engine, nor can he hold the mechanism in gear drive after he passes 30 M. P. H., vehicle speed. If he attempts to do either of these things the mechanism will instead do the proper thing for him.

In the modification Fig. 5, the power receiving gear 46' is integral with the clutch drum 32'. The power receiving gear 46' has a rearwardly extending hub 39' while the power take-off gear 43' has a forwardly extending hub 45. Hubs 39' and 45 are end splined together at 50, whereby gears 46' and 43' must always rotate in unison but have limited axial movement with respect to each other.

The adjacent faces of the gears 46' and 43' are hollowed out to receive the ground steel balls 55. There are four circular rows of these balls and there are fifteen balls in each row. Each row is separated from the next row by beveled edged collars 65. A single roller bearing 75 provides rotative support for both gears 46' and 43' about the drive shaft 13.

In the structure shown in Fig. 5, when the torque load exceeds the power, the helical teeth 104 move the gear 46' axially rearward to the position shown in the drawings. This creates the space 105 in the clutch whereupon the clutch is disengaged. When the power is able to increase the speed until the balls 55 move farther from the center than they are in the position shown, the gear 46' is forced forward and away from the gear 43' whereupon the space 105 is closed and the clutch is engaged.

In my co-pending applications Serial Number 650,523, filed January 6, 1933, and Serial Number 687,758, filed September 1, 1933, I disclose mechanism which is similar in principle to that herein shown. The herein disclosed mechanism, however, departs considerably in structure from the former applications and the prior art. Several points of similarity and several points of difference may be pointed out to facilitate consideration of the cases.

In Serial Number 650,523 and in the present application, the torque responsive means which restrains the weight masses from effecting clutch engagement becomes zero the instant the clutch is fully engaged and does not thereafter tend to disengage it, while in Serial Number 687,758 the torque responsive means tends to prevent engagement of the clutch and also tends to again disengage it after it has become engaged.

In all three of the applications under consideration, namely Serial Number 650,523, Serial Number 687,758 and the present application, the driven mechanism of the automatic unit comprises a power receiving element and a power take-off element, one of which elements is shiftable relative to the other said element by the torque being transmitted. The weight masses which move outwardly to engage the clutch are so connected to this shiftable element that the weights move toward or away from the axis of rotation whenever the shiftable element moves in either direction in relation to the other said element.

In Serial Number 650,523 the centrifugal members are carried on the power take-off element while the power receiving element has a fraction of a turn rotative movement relative to the power take-off element. The weights are then connected to the power receiving element so as to be drawn in by this fraction of a turn of rotative movement in one direction and forced out when the rotative movement is in the other direction. In such a structure the power receiving element acts on the weights to pull them in or allow them to move out. It follows that when the clutch is engaged for direct drive, and power is no longer transmitted through gearing to the power receiving element, there is no torque force tending to draw the weights back toward the axis.

In Serial Number 687,758 the centrifugal members are carried on the power receiving element while the power take-off element has a fraction of a turn of rotative movement relative to the power receiving element. The weights are then connected to the power take-off element so as to be drawn in or forced out as this fraction of a turn of rotative movement takes place in one direction or the other. In such a structure the torque being transmitted tends to pull the weights in after they have moved out and engaged the clutch.

In the present application the centrifugal members are carried on the power receiving element which has slight axial but no rotative movement with respect to the power take-off element. Axial movement of the power receiving element in one direction draws the centrifugal weights inward and axial movement in the other direction permits the weights to move outwardly. The force which moves the power receiving element axially against the weight influence being the axial component of the tangential load on the helical teeth of the power receiving element, it follows that when the clutch engages for direct drive, there is no torque effort tending to draw the weights inward to disengage the clutch.

Having described my invention, I claim,

1. The combination, in power transmission gearing, of a driving member, a driven member, a gear train connecting said driving and driven members, the last or driven gear of said train having helical teeth and being mounted to revolve said driven member but axially movable thereon by the axial component of the load carried by said gear, clutch means for connecting said driving and driven members directly, clutch operating means, and means connecting said axially movable gear and clutch operating means whereby said axial movement controls said clutch operating means.

2. The combination, in power transmission gearing, of a driving gear, an axially aligned driven gear having helical teeth and axial movement with respect to said driving gear controlled by the axial component of the load carried by said driven gear, clutch means for connecting said gears directly, gear means for connecting said gears for reduced speed, automatic means for operating said direct connecting means, and means controlling operation of said automatic means by the axial movement of said driven gear.

3. The combination, in power transmission mechanism, of a driving member, a driven member, a helical gear on said driven member for driving said driven member at a reduced speed, said gear being movable axially by the axial component of the load thereon, clutch means for connecting said driving and driven members to revolve in unison, speed responsive means for operating said clutch means into engagement, and means operable by axial movement of the driven gear effective to restrain the operation of said speed responsive means from engaging said clutch means.

4. The combination, in power transmission mechanism, of a driving member, a driven member, clutching means engageable for connecting said driving and driven members to revolve in unison, a helical gear secured to said driven member to rotate said driven member at a reduced speed, said gear being axially slidable on said driven member in one direction by the axial component of the load carried thereon, centrifugal weights secured to the helical gear to rotate therewith, means connecting said weights to said driven member operable by outward movement of said weights to move said gear axially opposite to the axial movement caused by the said load, and means for engaging said clutching means by the said axially opposite movement of said gear.

5. The combination, in power transmission mechanism, of a driving member, a driven member, a clutch for connecting said members to revolve in unison, gears for connecting said members to revolve at different speeds, weights carried by one of said gears operative by centrifugal force to move outwardly, means connecting said weights to said driven member operative by said outward movement to move said one gear axially in one direction, clutch engaging means operative by said axial movement, and means operative by load on said one gear to move said one gear axially in the other direction and disengage said clutch.

6. The combination, in power transmission mechanism, of a driving member, a driven member, a clutch for connecting said members to revolve in unison, speed reducing gears connecting said members to revolve at reduced speed, the lowest speed gear being secured to but axially slidable on the driven member, weights on the said lowest speed gear operative outwardly by centrifugal force, means on said weights operative by said outward movement to move said gear axially in one direction, means operative by said axial movements to engage said clutch, and means operative by load on said gear to move said gear axially in the other direction and disengage said clutch.

7. The combination, in a power transmission mechanism, of a power take-off element, a driven clutch member, and a driven gear all in axial alignment and secured together to revolve in unison, means to permit axial movement of said driven gear, a driving clutch member, means to transmit power from the said driving clutch member to the driven gear, centrifugal weights on the driven gear, means operative by outward movement of said weights to move said gear axially in one direction, means operative by said axial movement to engage said driving and driven clutch members to revolve in unison, and means operative by load on said gear to move said gear axially in the other direction and disengage said clutch.

8. The combination, in power transmission mechanism, of a driving member, a driven member, clutching means engageable for connecting said driving and driven members to revolve in unison, a helical gear secured to said driven member for driving it at a reduced speed, gearing connecting said helical gear to said driving member, said helical gear being axially slidable on said driven member in one direction by the axial component of the load carried thereon, centrifugal members secured to the helical gear to rotate in unison therewith, and means connecting said centrifugal members to said driven member and to said clutching means whereby outward movement of said centrifugal members urges engagement of said clutching means and inward movement of said centrifugal means urges said driven gear in the same axial direction as it is urged by the said axial component.

9. The combination, in power transmission mechanism, of a driving gear, an axially aligned driven gear having axial movement with respect to said driving gear, gearing connecting said gears for revolving the driven gear at a reduced speed, clutching means engageable for revolving the driven gear in unison with the driving gear, centrifugal members on the driven gear revolvable in unison therewith, means on said centrifugal members operable by outward movement of said centrifugal members for engaging said clutching means, means on said centrifugal members operable by outward movement of said centrifugal members for moving said driven gear axially, and helical teeth on said driven gear angled to cause the axial component of the load carried by said gear to move said gear axially opposite to the said axial movement caused by outward movement of said weights.

10. The combination, in power transmission mechanism, of a driving member, a driven member, a gear on the driving member, a gear drivably secured to but axially slidable on the said driven member, and reduction gearing connecting the two said gears, clutching means engageable by axial pressure for connecting said driving and driven members to revolve in unison, overrunning means in said gearing to permit said driven gear to revolve faster than it may be driven through said reduction gearing, centrifugal members hinged to said driven gear swingable outwardly from the axis of rotation of said gear, means on said centrifugal members for applying axial pressure to said clutching means and simultaneously moving said driven gear axially upon outward swinging of said weights, and helical teeth on said driven gear angled to cause the axial component of the load force carried by said teeth to move said driven gear axially opposite to the movement caused by outward swinging of said weights.

11. The combination, in power transmission mechanism, of a driving member, a driven member, a gear on the driving member, a gear drivably secured to but axially slidable on the said driven member, and reduction gearing connecting the two said gears, clutching means engageable by axial pressure for connecting said driving and driven members to revolve in unison, overrunning means in said reduction gearing to permit said driven gear to revolve faster than it may be driven by said reduction gearing, centrifugal members held on said driven gear by hinge pins extending transversely of the axis of rotation, the free ends being swingable outwardly from said axis, pressure fingers at the hinge ends for applying axial pressure to said clutching means upon outward swinging of said free ends, fulcrum means at said hinge end engaging said driven member whereby outward swinging of said free ends draws said driven gear axially, and helical teeth on said driven gear angled to cause the axial component of the load force carried by said teeth to move said driven gear axially opposite to the movement caused by outward swinging of said weights.

12. The combination, in power transmission mechanism, of a driving member, a driven member, a gear on the driving member, a gear drivably secured to but axially slidable on the said driven member, and reduction gearing connecting the two said gears, a clutch engageable by axial pressure for connecting the driving and driven members to revolve in unison, overrunning means in said reduction gearing to permit said driven gear to revolve faster than it may be driven by said reduction gearing, centrifugal members each having a hub at one end with pinion teeth thereon and a weight at the free end swingable outwardly about said hub, hinge pins extending transversely of the axis of rotation through said hubs into said driven gear whereby outward swinging of the said free ends rotates said hub, rack teeth extending transversely of the axis in said driven member engaging said pinion teeth whereby outward movement of said free ends moves said driven gear axially, pressure fingers on said hubs whereby outward movement of said free ends provides axial pressure to engage said clutch, and helical teeth on said driven gear angled to cause the axial component of the load force carried by said teeth to move said driven gear axially opposite to the said movement caused by outward swinging of the said free ends of the said weights.

13. The combination, in power transmission mechanism, of a driving member and driven mechanism comprising a driven clutch element for connecting the driving and driven members directly, an elongated hub on said clutch element, a power take-off element rigidly secured to said hub, a driven gear secured for rotation with said hub but axially slidable thereon, means to control said clutch by said axial movement, helical teeth on said driven gear angled to cause the axial component of the load force carried by said gear to move said gear axially toward the power take-off element to effect clutch disengagement, adjacent faces of the driven gear and the power take-off element being so formed that one extends into the other to compose a dash pot for limiting the speed with which one may move axially with respect to the other.

14. The combination, in power transmission mechanism, of a driving member, a driven member having an elongated hub, a clutch operable by axial movement for connecting the driving and driven members to revolve in unison, speed reducing gears connecting the driving and driven members, one of said gears being secured to said elongated hub to revolve said hub but being axially slidable thereon by the axial component of the load carried by said gear, said axial movement being operative to control clutch engagement, a power take-off element rigidly secured to said hub adjacent said axially movable gear, said element having a piston-like hub extending into a cylinder like opening in the face of said gear, the interior of the said elongated hub having an oil filled chamber connected by a small opening to said cylinder-like opening for restricting the rapidity of clutch control.

15. The combination, in power transmission mechanism, of a driving and a driven member in axial alignment on a shaft, clutch means for connecting them to revolve in unison, a gear on said driving member, a gear secured to said driven member to rotate said driven member but being axially slidable thereon, a parallel spaced apart countershaft, two independently rotatable gears on said countershaft in constant mesh with said driving and driven gears, a ratchet connecting said countershaft gears whereby the gear meshing with the driven gear may revolve faster than the gear meshing with the driving gear, helical teeth on said gears angled to cause the axial component of the load carried by said gears to force the driving and driven gears axially apart and the two countershaft gears axially together, speed responsive means for forcing said driving and driven gears axially toward each other, and means operative to engage said clutch when said driving and driven gears are forced toward each other and operative to disengage said clutch when said axial component of the load forces said driving and driven gears axially apart.

16. The combination, in power transmission mechanism, of a drive shaft, a driving gear secured to said shaft to rotate therewith, driven mechanism comprising a power receiving gear and a power take-off gear secured together to rotate in unison, both freely rotatable about the drive shaft, but one having axial movement with respect to the other, a clutch element secured to said drive gear to rotate therewith, a clutch element secured to said power receiving gear to rotate therewith, gearing connecting the driving and driven gears, helical teeth on said power receiving gear angled to cause the axial component of the load carried by said teeth to force said power receiving gear and said power take-off gear axially together thereby to draw said clutch members axially apart, weight members between the power receiving and the power take-off gears operable outwardly by centrifugal force, wedge means between said gears operable by said outward movement of said weights to force said gears axially apart thereby to force said clutch members axially together.

17. The combination, in power transmission gearing, of a driving clutch member, a driven clutch member, a power take-off element rigidly secured to said driven clutch member against rotative movement with respect thereto, reduction gearing connecting said driving clutch member to said driven clutch member, the lowest speed member of said reduction gearing being secured against rotative movement with respect to said power take-off element but having limited axial movement with respect to said power take-off element, speed responsive means carried on said axially movable gear operative to move said gear axially in one direction to connect said driving and driven clutch members to revolve in unison, and helical teeth on said axially movable gear angled to cause the axial component of the tangential load carried by said gear to urge said gear axially opposite to the direction it is being urged by said speed responsive means.

18. The combination, in power transmission mechanism, of a driving member, a driven member, clutch means for connecting said driving and driven members to revolve in unison, a power receiving member on said driven member for revolving said driven member at a different speed than said driving member, said power receiving member being urged axially in one direction with respect to the driven member by the load received thereby, clutch engaging means revolvable in unison with said driven member comprising a weight portion movable outwardly by centrifugal force and a portion movable axially by said outward movement, said axially movable portion joining said power receiving member to said driven member whereby outward movement of said weights moves said power receiving member axially with respect to said driven member oppositely to the direction which it is being urged by the said load.

19. In a device of the character described, a driving member, a driven member, a clutch for connecting said members, speed responsive means for controlling the clutch, gear means for connecting the members around the clutch upon disengagement thereof, said gear means comprising one gear movable axially by the axial component of the load carried thereby, and means connecting said one gear to said speed responsive means for controlling said speed responsive means by said axial movement of said gear.

20. The combination, in a device of the character described, of a driving member, a driven member, a clutch for connecting said members, gears connecting said members around the clutch upon disengagement thereof, one of said gears being movable axially by the load carried thereby, speed responsive means urging clutch engagement, a resilient means uniformly urging clutch disengagement, and a torque responsive connection between said axially movable gear and said speed responsive means variably opposing the effectuation of clutch engagement by said speed responsive means in proportion to the load being carried by said gear.

FREDERICK W. COTTERMAN.